3,535,394
PROCESS FOR THE CATALYTIC CHLORINATION OF CHLOROALKANES
Gianfranco Pregaglia, Milan, and Bruno Viviani and Marco Agamennone, Novara, Italy, assignors to Montecatini Edison S.p.A., Milan, Italy, a corporation of Italy
No Drawing. Filed May 26, 1967, Ser. No. 641,489
Claims priority, application Italy, May 31, 1966, 12,489/66
Int. Cl. C07c *17/10*
U.S. Cl. 260—658      5 Claims

ABSTRACT OF THE DISCLOSURE

Described is a process for the catalytic chlorination of partially chlorinated alkanes containing from 1 to 12 carbon atoms and mixtures thereof. Chlorine is fed into the reaction mixture to be chlorinated. The chlorination is carried out in the liquid phase in the presence of a catalyst consisting of a phosphorus halide and of small amounts of oxygen with an oxygen/fed chlorine ratio between 0.05:100 and 5:100 parts by volume, at temperatures up to 150° C. and at atmospheric or slightly higher pressure.

---

Our invention relates to a process for the catalytic chlorination in the liquid phase of partially chlorinated alkanes, even in the absence of light.

It is known that the substitution reaction of the hydrogen present in aliphatic hydrocarbons and in their partially chlorinated derivatives requires the activation of the $Cl_2$ molecule. This activation is usually obtained by thermal or photochemical means. Both techniques present some drawbacks in actual practice. The thermal chlorination is carried out at temperatures so high, at least 250° C., that serious problems of corrosion and heat exchange are created. On the other hand, photochemical chlorination requires irradiations between 3000 and 5000 A. thus requiring special equipment such as quartz mercury lamps, and expensive maintenance.

Catalytic chlorinations in the liquid phase are also known. These are generally carried out with inorganic chlorides based catalysts. The reaction at low temperature usually is so slow that it cannot be used industrially.

We have now found that chlorinations of partially chlorinated alkanes can be carried out with high productivities by employing chlorine, in the liquid phase, at temperatures below 150° C., at atmospheric or slightly higher pressure, provided the chlorination is carried out in the presence of a phosphorus halide and small amounts of oxygen.

The present invention therefore regards a process for the catalytic chlorination of partially chlorinated alkanes, containing from 1 to 12 carbon atoms, or mixtures thereof, by feeding chlorine into the reaction mixture to be chlorinated, by carrying out the chlorination in the liquid phase in the presence of a catalyst consisting of a phosphorus halide and small amounts of oxygen with an oxygen/fed chlorine ratio between 0.05:100 and 5:100 parts by volume, at temperatures up to 150° C. and at atmospheric or slightly higher pressure.

The chlorination process according to the present invention is applied to partially chlorinated alkanes having from 1 to 12 carbon atoms with the greatest advantage with partially chlorinated alkanes having from 1 to 6 carbon atoms. Examples of these compounds are: methylene chloride, chloroform, ethyl chloride, 1,1- and 1,2-dichloroethane, 1 - chloropropane, 2,3 - dichlorobutane, 2,2,3-trichlorobutane.

In the case of derivatives from the partial chlorination of methane and ethane, the combined action of a phosphorus halide and of small amounts of $O_2$ is decisive for obtaining of chlorination. In the case of chloro-derivatives with a higher number of carbon atoms, the chlorination also takes place in the absence of the above-mentioned catalytic system, but at a considerably lower speed.

The catalyst generally used is phosphorus pentachloride. It can be added per se to the reaction mixture, or it can be formed in situ by reaction between chlorine and phosphorus or $PCl_3$ dissolved in the chloroalkanes to be chlorinated. Oxygenated phosphorus compounds such as $POCl_3$, $P_2O_5$, $P_2O_3$, etc. are not active.

The concentration of the catalyst expressed as phosphorus can vary within rather wide limits, depending upon the compound to be chlorinated, and is comprised between 0.1 and 20 grams, preferably between 1 and 10 grams per liter of reaction mixture. Generally, an optimal catalyst concentration exists which, for instance in the case of the chlorination of $CHCl_3$, is between 2.5 and 4 grams of P/liter of solution. On the other hand, in the case of the chloroalkanes having 4 carbon atoms, said concentration is higher (9–10 g./l).

Oxygen per se can be fed together with chlorine or added directly to the reaction mass. Oxygen may be suitably diluted, for instance with nitrogen or air. In practice, it is sufficient to add small amounts of air to the chlorine fed. Moreover, oxygen can be furnished to the system by adding a substance capable of releasing it under the reaction conditions.

The oxygen concentration in the chlorine (and therefore the oxygen/chlorine ratio) can vary within wide limits, between 0.05 and 5% by volume, and conditions the reaction rate. In general, the speed increases with the increase of the oxygen content in the chlorine until it reaches a maximum value, and then decreases. The optimal oxygen concentration depends upon the other working conditions (concentration and nature of the starting chloroalkane, temperature, stirring etc). For instance, in the chlorination of chloroform, the rate is considerable with even an $O_2$ content in chlorine of 0.2%, it is higher at concentrations of 0.4–2%, while it is considerably reduced at values of 4–5%. Ethyl chloride and 1,1-dichloroethane are chlorinated with high rates at oxygen concentrations of 1% in the chlorine fed.

The process according to the present invention can be applied within a rather wide temperature range, depending upon the reactivity of the starting chloroalkane. The reaction rate increases with the increase in temperature, but at high temperatures it may be necessary to operate under pressure or in the presence of a diluent in order to keep dissolved the chlorine and the chloroalkane and to avoid entrainment of reactants by the gases leaving the reactor. For instance, the chlorination of $CHCl_3$ starts already at 30–35° C. At 50–60° C. the rate is high and further increases can be observed at higher temperatures, provided one operates under pressure. In the chlorination of ethyl chloride, even at 50° C., high conversion rates are obtained by operating at about 4 atmospheres. In this case the reaction can also be carried out at atmospheric pressure, diluting the reagent with methylchloroform. 1,1-dichloroethane and 2,3-dichlorobutane are readily chlorinated satisfactorily at 50° C. and at 70° C. respectively, by operating in both cases at atmospheric pressure.

The chlorination can be carried out in various ways. In batchwise operation, chlorine containing oxygen is introduced into the reaction mixture, in which the catalyst is dissolved, until the desired conversion of chloroalkane is reached. In continuous operation in one stage, for instance, the chlorine-oxygen mixture and the chloroalkane containing the catalyst are fed into a reactor in which a foot of reaction mixture is present. A liquid phase consisting of the reaction product and a gaseous phase substantially consisting of the reaction HCl and of unconverted chlorine, are discharged.

The operation can also be carried out in more than one stage and in countercurrent, by operating for instance in a reactor consisting of a plate column: the chloroalkanes to be chlorinated and the catalyst are fed overhead and the HCl is removed together with the unconverted chlorine; at the bottom the chlorine-oxygen mixture is introduced and the reaction product is discharged. The countercurrent scheme can also be conveniently realized with more than one reactor arranged in series. The reaction product consists of one or more chloroalkanes in which small amounts of chlorine, hydrochloric acid and catalyst (substantially $PCl_5$) are dissolved.

The separation of the chloroalkanes from the catalyst can be carried out by washing the crude product with water or with equeous alkali solutions and subjecting the organic phase to rectification after drying. Alternatively, this operation can be achieved by directly rectifying the crude product in the presence of chlorine, so as to avoid the decomposition of $PCl_5$ into $PCl_3$. In this way, the catalyst to be recycled to the chlorination process is recovered as tail product while at the head chloroalkanes, free of phosphorus, are obtained.

In order to illustrate further the present invention, the following examples are presented.

EXAMPLE 1

This example illustrates the effect of oxygen on the course of the reaction.

Into each of three reactors, provided with thermometer, stirrer, dipping tube with a porous disc for feeding the gas, and reflux cooler, are introduced 250 cc. of deaerated chloroform and, respectively, 0.93 g. of white phosphorus, 4.3 g. of phosphorus trichloride and 6.8 g. of phosphorus pentachloride. These quantities are practically equivalent and correspond to about 3.7-4 g./l. of phosphorus. All reactors are shielded so as to avoid the infiltration of light. The apparatus is purged with $N_2$, the solutions are heated to 50° C. and 50 g./h. of $Cl_2$ are sent in. During the first 30 working minutes, a weak development of HCl from the reactors is evident, corresponding to a conversion of 2-4% of $CHCl_3$, but subsequently the reaction stops.

If a stream of 10 N l./h. of air, under the same conditions, is fed into the three reactors, a lively development of HCl begins again, so much so that the flow of $Cl_2$ can be increased to 150 g./h. After 30 minutes the molar conversion of $CHCl_3$ exceeds 30%. The reaction stops only when the chlorination is finished.

EXAMPLE 2

Into a glass cylindrical apparatus, shielded from the light, having an internal diameter of 45 mm. and a height of 450 mm. provided with thermometer and a reflux condenser with brine circulation at —20° C., are charged 10 mols of pure anhydrous $CHCl_3$ and 9.6 cc. of $PCl_3$ (the concentration of phosphorus in solution is equal to 4.26 g./l.). Chlorine is introduced until the $PCl_3$ present is chlorinated. The reactor is brought to 50° C. and then $Cl_2$ containing 6% of air is sent in such amounts as to obtain a concentration of $Cl_2$ of the 0.15 mol/liter in the reaction solution.

The chlorination is continued for 3 hours until more than 90% of the $CHCl_3$ is converted while measuring the productivity per hour (grams per hour per liter of solution) for various $CCl_4$ concentrations (molar percent):

| $CCl_4$, percent M: | Productivity, g./h.l. |
|---|---|
| 20 | 1900 |
| 40 | 1300 |
| 60 | 650 |
| 80 | 180 |

At the end of the run, the reaction product consists of 93% of $CCl_4$, 6.7% of unconverted $CHCl_3$ and 0.3% of polychloroethanes.

EXAMPLE 3

A solution of 2000 cc. of $CCl_4$ and 500 cc. of $CHCl_3$ containing 8.5 g. of dissolved P is charged into a 3-liter flask, shielded in order to exclude the action of light, thermostatically controlled at 50° C., provided with a reflux condenser at —10° C., stirrer, thermometer, dipping tube for the introduction of $Cl_2$ and of $CHCl_3$ and means for the continuous discharge of the reaction products. By operating at 50° C., chlorine is sent in and the volume of the liquid in the reactor is kept constant. Under steady conditions, the feedings per hour to the reactor are: 2.6 mols of $CHCl_3$ containing 4 g./l. of dissolved P, 1.96 mols of $Cl_2$ and 3.6 N liters of air.

From the analysis and the weight balance of the material results:

|  | G./l. |
|---|---|
| Concentration of P of the reaction product | 3.4 |
| Concentration of $Cl_2$ of the reaction product | 0.8 |

Composition of the chloroalkanes present in the crude product:

|  | Percent |
|---|---|
| Chloroform | 20.0 |
| Tetrachloromethane | 79.5 |
| Polychloroethanes | 0.5 |

Composition of the gases at the outlet of the condenser:

|  | Percent |
|---|---|
| Chloromethanes | 5.1 |
| Hydrochloric acid | 86.4 |
| Chlorine | 1.6 |
| Phosgene | 0.2 |
| Nitrogen+oxygen | 6.7 |

The molar yield in $CCl_4$ is 99% (calculated on the converted $CHCl_3$).—Specific production: 113 g./h./l.

| Balance of chlorine: | Percent |
|---|---|
| in the crude product | 0.3 |
| in $CCl_4$ | 91.7 |
| in chloroethanes | 0.1 |
| unreacted | 1.8 |
| reacted with P | 4.9 |
| losses | 1.2 |

EXAMPLE 4

By the technique and with the equipment described in Example 1, 80 g./h. of $Cl_2$ and 5 N l./h. of air are sent into a mixture containing 15.7% by weight of $CH_2Cl_2$, 33.36% of $CHCl_3$, 50.72% of $CCl_4$ and 3.10 g./l. of phosphorus.

The composition of the reaction mixture referring to the individual chloromethanes is:

| After minutes— | $CH_2Cl_2$, percent | $CHCl_3$, percent | $CCl_4$, percent |
|---|---|---|---|
| 30 | 8.50 | 38.60 | 52.90 |
| 60 | 3.57 | 35.68 | 60.75 |
| 90 | 2.15 | 32.98 | 64.87 |
| 120 | 0.30 | 24.27 | 75.43 |

EXAMPLE 5

With the apparatus and the modalities described in Example 3, the continuous chlorination of a $CHCl_3$–$CH_2Cl_2$ mixture is carried out, feeding each hour 2.09 mols of $CHCl_3$ and 0.60 mols of $CH_2Cl_2$ (containing 3.60 g./l. of P), 2.69 mols of $Cl_2$ and 1.5 N l. of air.

The analysis and the weight balance after 12 working hours under steady conditions show:

|  | G./l. |
|---|---|
| Content of P of the reaction product | 2.9 |
| Content of $Cl_2$ of the reaction product | 2.8 |

Composition of the chloroalkenes present in the reaction product:

| | Percent |
|---|---|
| Methylene chloride | 0.7 |
| Chloroform | 20.2 |
| Tetrachloromethane | 78.6 |
| Polychloroethanes | 0.5 |
| Conversion of the chloromethanes | 75.4 |
| Molar yield in $CCl_4$ on the converted chloromethanes | 98.5 |

Specific production in $CCl_4$: 117 g./h/l.

Balance of the chlorine:

| | Percent |
|---|---|
| in the crude product | 0.4 |
| in tetrachloromethane | 70.6 |
| in chloroform | 21.1 |
| in chloroethanes | 0.1 |
| unreacted | 4.4 |
| reacted with phosphorus | 2.3 |
| losses | 1.1 |

EXAMPLE 6

3 mols of ethyl chloride and 2.4 cc. of $PCl_3$ are charged into a Pyrex pipe (diameter 30 mm., height 500 mm.) maintained at constant temperature by water circulation, provided with a brine condenser, a well for a thermometer, and a dipping tube reaching the bottom, for the introduction of the $Cl_2$ and $O_2$ mixture. Keeping the temperature of the reactor at 50° C., the pressure at 4 atmospheres and the temperature of the condenser at −16° C., 0.6 M/h. of $Cl_2$ containing 1.2% of $O_2$ are introduced. The reaction starts almost immediately: the conversion of $Cl_2$ during the first hour is 80%, during the 5 following hours 90–94%, while during the subsequent 6 hours it diminishes progressively to 40%. The ethyl chloride is totally converted after 6 hours.

The analysis of the samples taken at various intervals is shown in the following table:

| Chloroethanes | After— | | | | |
|---|---|---|---|---|---|
| | 1 hr. | 3 hrs. | 6 hrs. | 10 hrs. | 13 hrs |
| Ethyl chloride | 59.28 | 23.00 | 0.14 | 0.02 | 0.01 |
| 1,1-dichloroethane | 19.97 | 38.40 | 32.80 | 8.16 | 3.95 |
| 1,2-dichloroethane | 10.52 | 20.85 | 20.40 | 0.32 | |
| 1,1,1-trichloroethane | 9.54 | 13.60 | 16.20 | 32.34 | 32.19 |
| 1,1,2-trichloroethane | 0.48 | 3.90 | 28.70 | 38.69 | 33.28 |
| 1,1,2,2-tetrachloroethane | 0.21 | 0.25 | 0.70 | 8.78 | 12.42 |
| 1,1,1,2-tetrachloroethane | | | 0.84 | 10.88 | 15.74 |
| Pentachloroethane | | | 0.22 | 0.81 | 2.41 |
| Hexachloroethane | | | | | |

EXAMPLE 7

Into the apparatus described in Example 2, 5 mols of 1,1-dichloroethane and 4.7 cc. of $PCl_3$, corresponding to a phosphorus content of 4.07 g./l., are introduced. The apparatus is maintained at 50° C. while feeding 1 M/h. of $Cl_2$ containing oxygen (2.9% by volume). The analysis of the samples taken at increasing conversions of 1,1-dichloroethane is shown in the following table:

| Chloroethanes | Percentage composition | | | |
|---|---|---|---|---|
| 1,1-dichloroethane | 79.39 | 70.45 | 59.65 | 51.91 |
| 1,1,1-trichloroethane | 13.82 | 19.80 | 27.42 | 32.63 |
| 1,1,2-trichloroethane | 6.23 | 8.70 | 11.10 | 13.60 |
| 1,1,1,2-tetrachloroethane | 0.30 | 0.41 | 0.65 | 1.12 |
| 1,1,2,2-tetrachloroethane | 0.26 | 0.33 | 0.38 | 0.74 |

EXAMPLE 8

In order to illustrate the increase in chlorination rate of chlorobutane, due to the presence of P and $O_2$ in the reaction mixture, two runs for comparison were carried out in the apparatus described in Example 2. In the first run, one mol of 2,3-dichlorobutane, containing 3.2 cc. of dissolved $PCl_3$, was chlorinated at 70° C. with 0.5 M/h. of $Cl_2$, containing 1.2% of $O_2$. The reaction was continued for the time necessary to convert 70% of the chlorobutane charged.

In the second run, an equal amount of 2,3-dichlorobutane was chlorinated with the same operating modalities, but in the absence of phosphorus and oxygen. The times needed to reach the cited conversion were 95 and 220 minutes, respectively.

The letter "N" as used hereinabove indicates normal or standard conditions, that is, 0° C. and 760 mm. Hg.

We claim:

1. A process for the catalytic substitution chlorination of partially chlorinated alkanes containing from 1 to 12 carbon atoms, and mixtures thereof, by feeding chlorine into the reaction mixture to be chlorinated, which comprises carrying out the chlorination in liquid phase in the presence of a catalyst consisting of a phosphorus chloride and oxygen with an oxygen/fed chlorine ratio between 0.05:100 and 5:100 parts by volume, at temperatures from 30° to 150° C. and from atmospheric pressure to four atmospheres.

2. The process of claim 1, wherein the phosphorus halide is phosphorus pentachloride.

3. The process of claim 2, wherein the phosphorus pentachloride is formed in situ.

4. The process of claim 1, wherein the phosphorus chloride is employed in amounts expressed as phosphorus between 1 and 10 grams, per liter of reaction mixture.

5. The process of claim 1, wherein the crude reaction product is rectified in the presence of chlorine, to give at the bottom phosphorus pentachloride, which is recovered and recycled to the process, and at the top chloroalkanes free of phosphorus.

References Cited

UNITED STATES PATENTS

| 1,144,237 | 6/1915 | Perkin et al. | 260—658 |
| 2,480,982 | 9/1949 | Thurman et al. | 260—658 |
| 3,267,162 | 8/1966 | Bohl | 260—662 XR |
| 3,345,422 | 10/1967 | Piester et al. | 260—658 |
| 3,363,010 | 1/1968 | Schwarzenber | 260—658 XR |

FOREIGN PATENTS 721,331  11/1965  Canada.

OTHER REFERENCES

Stewart et al., Jour. Amer. Chem. Soc., vol. 51, 1929, pp. 3082–3095.

Groggins, Unit Processes in Organic Synthesis, McGraw-Hill, New York (1958), pp. 227, 236.

BERNARD HELFIN, Primary Examiner

H. T. MARS, Assistant Examiner